May 22, 1951  J. W. WESTBROOK, SR  2,554,285
FOOT MEASURING DEVICE
Filed July 30, 1946  3 Sheets-Sheet 1

Inventor
JOSEPH W. WESTBROOK, SR.,
By Church & Church
His Attorneys

May 22, 1951  J. W. WESTBROOK, SR  2,554,285
FOOT MEASURING DEVICE
Filed July 30, 1946  3 Sheets-Sheet 3
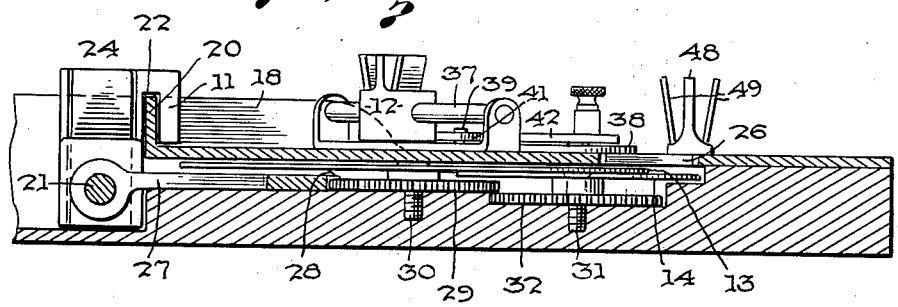
Fig. 3.
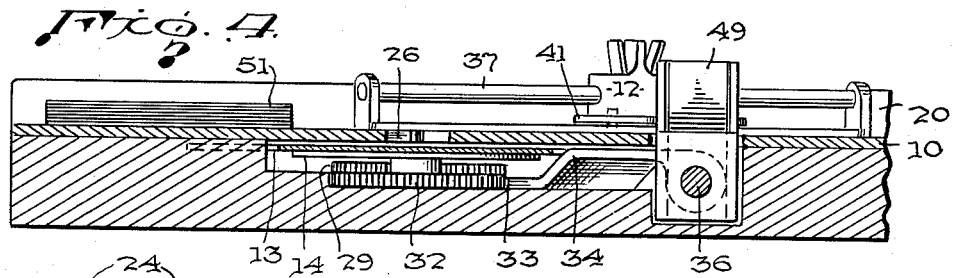
Fig. 4.
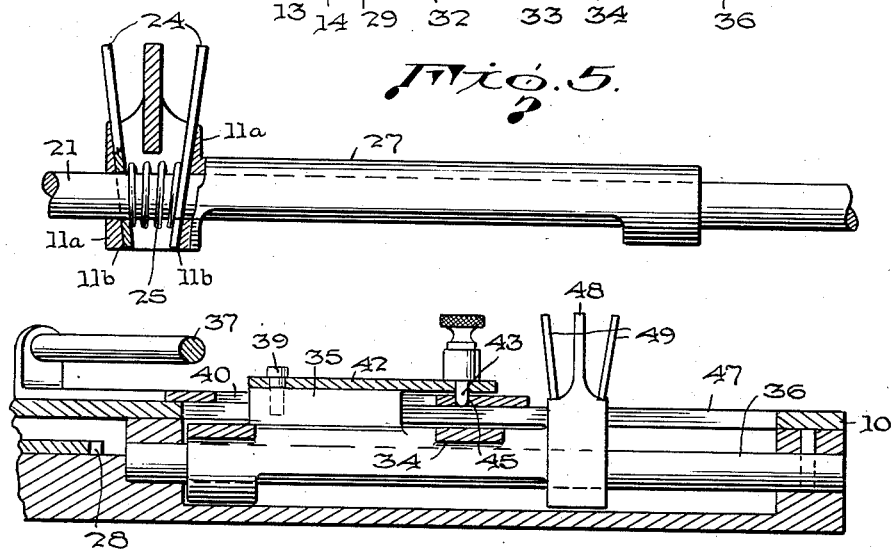
Fig. 5.
Fig. 6.
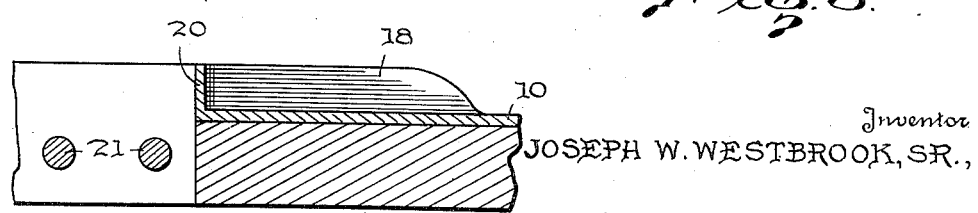
Fig. 7.
Inventor
JOSEPH W. WESTBROOK, SR.,
By Church & Church
His Attorneys Patented May 22, 1951

2,554,285

UNITED STATES PATENT OFFICE 2,554,285

FOOT MEASURING DEVICE

Joseph W. Westbrook, Sr., Greensboro, N. C.

Application July 30, 1946, Serial No. 687,049

6 Claims. (Cl. 33—3)

This invention relates to apparatus or devices for the measuring of an individual's feet in the process of fitting shoes.

In accordance with the present invention the foot or feet of a person are positioned on a foot supporting plate, or the cover plate of the apparatus in the present instance, in a predetermined location for measuring them and one object of the invention is to provide a simple arrangement which will facilitate the proper positioning of the feet of various individuals on said plate regardless of the size and shape of the heels of the feet to be measured.

Another object of the invention is to provide means for measuring the length of an individual's foot or feet, for the purpose of fitting shoes, by determining the distance from the back of the heel of the foot to the forward curved surface of the inner ball joint of the foot as distinguished from measuring from the heel to what might be called the high point (laterally of the foot) of the inner ball joint.

Still another object is to provide a dial arrangement for indicating both the length and width of a person's foot, means preferably being employed for locking the dials in the positions in which they have been moved in the foot measuring process whereby the shoe salesman need not make a hasty reading of the dials and can thus eliminate possibilities of error.

Separate dials are used for indicating the length and width of a foot, and another object of the invention is to provide foot engaging members which are movable into contact with the inner and outer ball joints of a foot positioned on the foot supporting plate, one of these foot engaging members being movable longitudinally of the foot for determining length and the other being movable laterally of the foot for determining width with both of said foot engaging members operatively connected with their respective dials whereby each dial is responsive to the movement of the foot engaging member with which it is mechanically associated.

It is a well known fact that a woman's shoe of a given length is not as wide across the insole as a shoe of the same marked size for a man and a further object of the present invention is to provide for adjustment of the outer ball joint engaging member with which the width of the foot is measured. In other words, the outer ball joint member can be primarily adjusted depending upon whether a woman's foot or a man's foot is being measured so that the movement of the indicating dial in response to the movement of the outer ball joint engaging member will be corrected to compensate for the difference between the widths of shoes for men and women.

With these and other objects in view, the invention consists in certain details of construction and combinations and arrangements of parts, all as will hereinafter be more fully described and the novel features thereof particularly pointed out in the appended claims.

In the accompanying drawings:

Fig. 3 is a detailed sectional view on the line 3—3 of Fig. 1;

Fig. 4 is a detailed sectional view on the line 4—4 of Fig. 1;

Fig. 5 is a detailed view in side elevation of the mounting for one of the ball joint engaging members; and Fig. 6 is a detailed view partly in elevation and partly broken away showing one corner of the foot supporting plate and the upwardly extending side members for locating a person's foot in the proper position on said plate.

Figure 1:
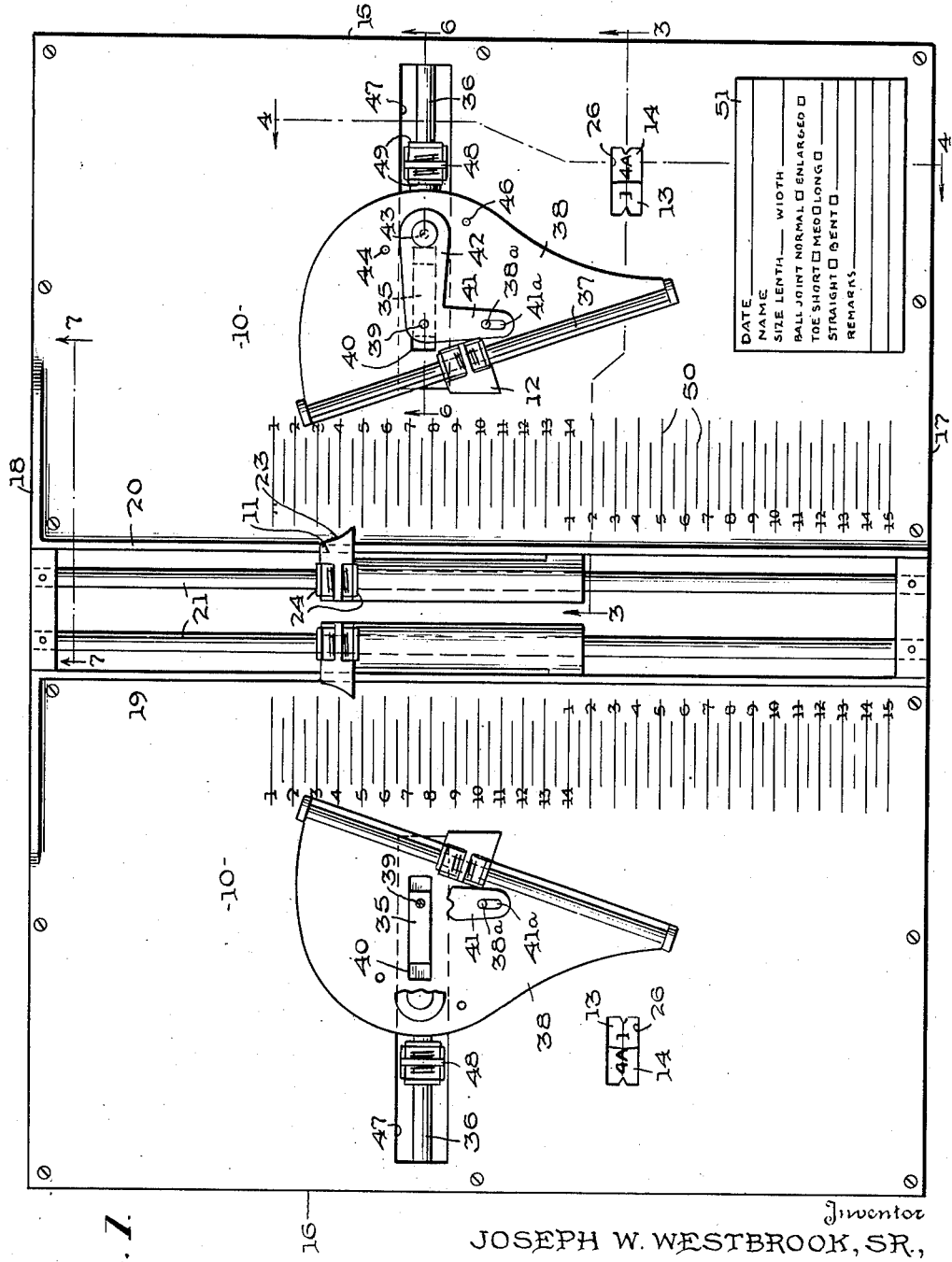
Figure 1 is a top plan view of an apparatus constructed in accordance with the preferred embodiment of the present invention.
Figure 2:
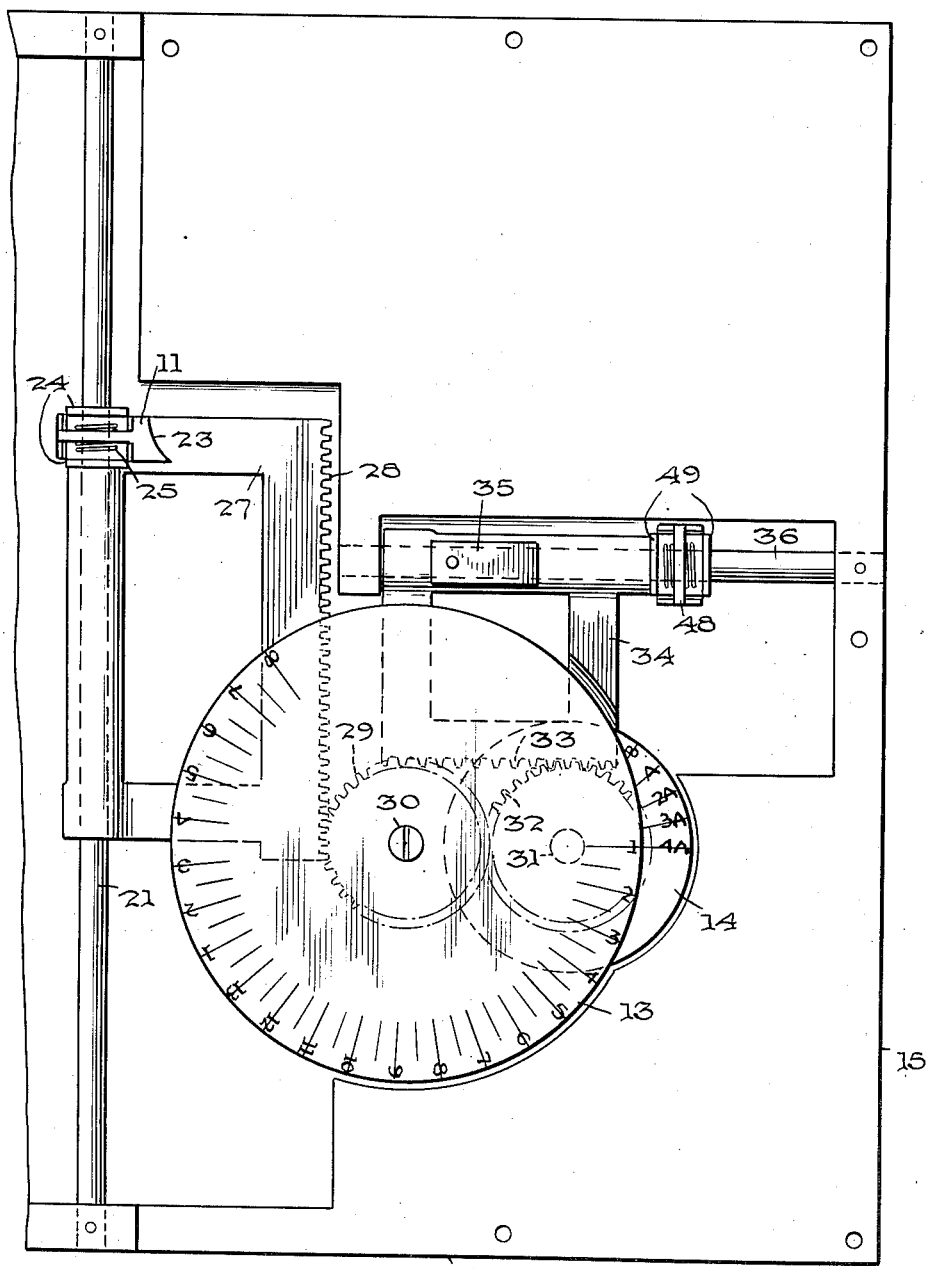
Fig. 2 is a similar view with the top or cover plate removed but illustrating substantially only one-half of the machine.

The present apparatus consists generally of a foot supporting platform 10 which may constitute the cover plate for the housing or casing of the apparatus and which is combined with means for positioning the foot or feet of an individual in proper location on said platform with respect to movable gauges or ball joint engaging members 11, 12, for each foot, said members or gauges being operatively associated with graduated disks 13, 14, for indicating the length and breadth of each of the individual's feet.

In addition to the cover plate 10, the casing of the apparatus comprises side walls 15, 16, and end walls 17, 18, with the end wall 18 projecting above said cover plate 10. Associated with this end wall 18 are two foot positioning members 19 and 20, which may be described as constituting partitions extending between the end walls 17, 18 and projecting above the cover plate 10. These partition members 19, 20, in conjunction with the end wall 18, provide means for properly locating the foot or feet of an individual on the cover plate 10. As the members 19 and 20 are disposed at right angles to the end wall 18 such foot positioning means can accommodate feet of various sizes and shapes so far as concerns the contour of the individual's heels. In other words, the right foot of a person will be positioned with the heel against the end wall 18 and the inside of the foot against the member 19. Similarly, the left foot of the individual will be positioned with the heel against the end wall 18 and the inside of the left foot against the member 20.

The instrumentalities for measuring the length and width of each foot are identical and hence it will be necessary to describe only the mechanism or devices which are used in determining the length and width of one foot of an individual. For instance, in the case of the left foot, the ball joint engaging member or gauge 11 is slidably mounted on a rod 21 mounted in the end walls 17, 18, of the casing, said gauge 11 being recessed, as at 22, so that it is also slidably received on the foot positioning member or partition 20. The edge of the gauge or ball joint engaging member is adapted to be placed in contact with the inner ball joint of the foot and is formed with a concave surface 23 which is adapted to engage against what will be called the forward portion of the curved surface of the ball joint of the foot as distinguished from those devices where a measuring member is adapted to engage against what might be called the crown or center of the ball joint. When the weight of one's body is supported by the foot, the arch of the foot naturally flattens out and causes the foot to elongate so that the forward curve of this inner ball joint moves forward. Therefore, measuring from the heel to the forward curve of this inner ball joint is the correct and most accurate method of determining proper shoe length of a foot. Preferably, this ball joint engaging member 11 comprises side portions 11a which are provided with openings through which the slide rod or bar extends and confined between these side portions 11a are gripping members 24 which are also apertured for reception of the slide bar 21 and which are held by a coil spring 25 against inner downwardly converging surfaces 11b of the side portions 11a of the ball joint engaging member. With the clamping members 24 flat against these converging surfaces 11b, they will bind on the slide rod 21 and lock the member 11 against movement but, as will be understood, by pinching the clamping members 24 toward one another they will be released so that the member 11 can be adjusted to any desired point along the bar 21 into contact with the forward portion of the curved surface of the inner ball joint of a foot positioned on the plate 10. When so adjusted the distance between the end wall 18 and the member 11 corresponds to the proper shoe length of the foot being measured and in order to clearly indicate this shoe length the member 11 is operatively associated with the dial 13, which carries a series of graduations corresponding to various shoe lengths. This dial 13 is located within the casing or below the top plate 10 and the graduations thereon are in registry with a sight opening 26 in the cover plate. Preferably, sight opening 26 is of such a size as to expose only one length measurement or graduation on dial 13 which, by reason of the mechanism with which said dial is connected to member 11 will be the proper shoe length graduation for the foot being measured. Preferably, these operating connections consist of a rectangular frame 27 integral and movable in unison with the member 11 on bar 21 and one side or edge of this frame 27 constitutes a rack bar 28 which is in engagement with a gear 29 on a shaft 30 journaled in the casing and which carries the shoe length indicating dial 13. Hence, as will be apparent, as member 11 is moved lengthwise of bar 21 the frame 27 through rack 28 and gear 29 will rotate the dial 13 and, as the length graduations on said dial are calibrated to correspond with various positions of member 11 on bar 21 the proper shoe length graduation will be exposed in the sight opening 26.

As previously mentioned, the width of the foot is measured with the gauge member 12 which might be termed a gauge block operatively associated with dial 14 which carries shoe width graduations and is mounted on a shaft 31 on which there is also mounted a gear 32. Gear 32 is in mesh with a rack 33 on one edge of a rectangular frame 34 which is, in turn, part of or integral with a block 35 slidably mounted on a slide bar or rod 36 disposed transversely of the foot supporting plate 10. For purposes which will presently appear, the gauge block 12 is slidable on a bar 37 mounted on a plate 38 which, in turn, is carried by and movable in unison with the block 35. Thus, when the gauge block 12 is moved transversely with respect to the foot locating member 20, the frame 34 with its rack 33 will impart a rotary motion to the shoe width dial 14. Preferably, the two dials 13, 14, partially overlie one another so that the readings on the two dials will appear side by side in the sight opening 26 in plate 10. Of course, a single sight opening is not essential but is preferred as it simplifies the reading of the dials.

As is well known, women's and men's shoes of the same length size differ in width and, for this reason, it is essential that means be provided for compensating for this difference in widths, depending upon whether a man's foot or a woman's foot is being measured for width. For this purpose, plate 38 carrying the gauge block 12 is adapted to be adjusted relatively to the block 35 on which said plate is carried so that the plate can be adjusted with respect to the operating connections between it and dial 14, depending upon whether a man's foot, a woman's foot, or a child's foot is being measured for width. Preferably, block 35 is provided with a pivot pin 39 which extends through a comparatively short slot 40 in plate 38 and pivoted on said pin 39 is a bell crank lever one of whose arms 41 is pivotally attached to block 35 and the other of whose arms 42 is adapted to be rocked to shift plate 38 by a pin 38a engaging in a slot 41a in arm 41 with respect to block 35. Preferably, arm 42 of said bell crank lever carries a locking pin 43 which may engage in either of three holes 44, 45, or 46, in plate 38 to lock the plate 38 in fixed position with respect to block 35. The hole 44 in plate 38 is the point at which arm 42 of the bell crank lever is adjusted when a man's foot is being measured for width; hole 45 determines the position of the bell crank lever for measuring a woman's foot, and hole 46 determines the position of the lever when a child's foot is being measured. As will be appreciated, adjustment of the bell crank lever to position the pin in hole 46 will move the plate 38 and gauge block 12 toward foot positioning member 20 without affecting the position of block 35 and, on the contrary, adjustment of the bell crank lever to position pin 43 in hole 44 will move gauge block 12 in the opposite direction without altering the position of block 35. In other words, the dial 14 is calibrated on a basis for measuring a woman's foot for width with the bell crank lever located with its pin 43 positioned in hole 45 in plate 38. Assuming this later position to be what might be termed a neutral position for measuring a woman's foot, positioning of pin 43 in hole 44 will enlarge the distance between gauge block 12 and foot positioning member 20 to compensate for the increased width of men's feet whereas by positioning pin 43 in hole 46 gauge block 12 will assume a position closer to member 20 when measuring children's feet which, of course, are narrower.

It will be understood that the foot supporting plate or cover 10 is slotted, as at 47, for accommodation of the block 35 and a finger piece 48 by which said block is adjusted on slide bar 36. Finger piece 48 is also provided with clamping plates 49 spring pressed as in the case of the clamping plates 24 of the finger piece for gauge block 11 so as to lock the finger piece and the associated block 35 and rack member 34 in any desired adjusted position. It should be added that in measuring the width of a foot the gauge block 12 is adapted to be positioned against the outer ball joint of the left foot and hence may be called the outer ball joint locator.

In view of the fact that some individuals have comparatively long toes while others have comparatively short and still others have what are termed medium length toes, it is also necessary in the proper fitting of shoes to take this difference into consideration for determining the style or length of vamp that is best suited in the fitting of any given individual's foot. For this reason, a vamp scale consisting of graduations 50 are provided on the cover plate 10 lengthwise of each of the foot positioning members 19, 20. This vamp scale is of a dual character in that the graduations nearest the end wall 18 are for children's shoes running from size 1 to 13 and on to 3 in the adult's scale which merges into the children's scale, said adult scale continuing to run up to size 15 at the edge of plate 10 opposite wall 18. Thus, in fitting a person with shoes the foot is placed on plate 10 with the heel against end wall 18 and the inside of the foot against one of the members 19 or 20, depending upon whether the right or left foot is being measured, the foot extending from the wall 18 to a point overlying the vamp scale 50. Gauge block 11 is then adjusted on slide bar 21 to position it against the forward curve of the inside ball joint which will result in the foot length being indicated at the left of sight opening 26, as the apparatus is viewed in Fig. 1. Next, plate 38 having been adjusted depending upon whether a man's, woman's or child's foot is being measured, gauge block 12 is then moved axially of rod 37 to a position opposite the outside ball joint of the foot. Then, finger piece 48 is released so block 35, plate 38 and gauge block 12 are moved transversely toward the foot until gauge block 12 engages the outer ball joint whereupon the shoe width will be indicated at the right of sight opening 26. Similarly, the position of the extremities of the toes is noted on the vamp scale to determine whether the individual requires a shoe with a short, medium or long vamp. In this manner the person can be accurately fitted with shoes of the proper size in every essential respect.

If desired a permanent record may be made of each individual's shoe requirements. For this purpose a record tablet 51 may be provided at one corner of the cover plate 10, the pages of the record tablet having appropriate data and spaces for entry of information regarding each patron to whom shoes are fitted.

As previously stated, the mechanisms for measuring the right and left feet are the same and it is deemed necessary to give a detailed description of only the mechanism for measuring the left foot.

What is claimed is:

1. In a foot measuring apparatus, a foot supporting plate and means for measuring the width of a foot positioned on said plate, said means comprising a slide bar disposed tranesversely of the foot supporting area of the plate, a member slidable on said bar, a pivot pin mounted in said member, a measuring plate slidable on said member lengthwise of said bar, said measuring plate overlying said member and having a slot therein through which said pivot pin projects, a bell crank lever pivoted on said pivot pin and having one arm thereof attached to said plate whereby rocking movement of said bell crank lever will move said measuring plate relatively to said member, means for releasably locking said bell crank lever in adjusted position, a foot engaging member carried by said measuring plate and adjustale on said plate longitudinally of a foot positioned on said foot supporting plate, said member together with said measuring plate and foot engaging member being slidable on said rod as a unit, a dial having foot width graduations thereon and operating connections between said sliding member and dial for rotating said dial upon movement of said sliding member on the slide bar.

2. In a foot measuring apparatus, a foot supporting plate, a slide bar disposed transversely of the foot supporting plate, a sliding member on said slide bar, a rotatable dial having foot width graduations thereon, operating connections between said sliding member and dial for rotating the latter upon movement of said member on the slide bar, a foot measuring plate, a foot engaging member on said plate, means for releasably locking said foot measuring plate to said sliding member, and means for adjusting said foot measuring plate relatively to said sliding member in a direction axially of said slide bar.

3. In a foot measuring apparatus, a foot supporting plate, a first slide bar disposed longitudinally of said plate, a second slide bar disposed transversely of said plate, a pair of vertically disposed shafts spaced from both bars, a foot length indicating dial on one of said shafts, a first gear on said shaft, an inner ball joint engaging member slidable on said longitudinal bar, a first rectangular frame on said inner ball joint engaging member, rack teeth along one edge of said first frame and engaged with said first gear, a foot width indicating dial on the other of said shafts, a second gear on said other shaft, an outer ball joint engaging member slidable along said transverse rod, a second rectangular frame on said outer ball joint engaging member, and rack teeth along one edge of said second frame engaged with said second gear, said foot supporting plate having openings above said dials and spaced from said members to expose at least one graduation on each of said dials.

4. In a foot measuring apparatus having a foot supporting plate, a foot width indicating device comprising a slide bar disposed transversely of said foot supporting plate, a foot width measuring plate slidable along said bar, an outer ball joint engaging member slidable on said foot width measuring plate longitudinally of said foot supporting plate, a toothed rack connected to said plate, and a rotatable foot width indicating dial turnable by said rack upon movement of said foot width measuring member.

5. In a foot measuring apparatus having a foot supporting plate, a foot width indicating device comprising a slide bar disposed transversely of said plate, a foot width measuring plate slidable along said bar, a rod on said plate extending forwardly and outwardly with respect to said slide bar, an outer ball joint engaging member slidable along said rod, a foot width indicating dial, and a rack connected to said foot width measuring plate for turning said dial upon sliding movement of said foot width measuring plate along said slide bar.

6. In a foot measuring apparatus having a foot supporting plate, a foot width indicating device comprising a slide bar disposed transversely of said foot supporting plate, a block slidable along said bar, a rotatable foot width indicating dial, operating connections between said block and said dial for rotating the latter upon movement of said block on said slide bar, a foot width measuring plate, means for adjustably positioning said foot width measuring plate relative to said block in a direction axially of said slide bar, and an outer ball joint engaging member slidable on said foot width measuring plate longitudinally of said foot supporting plate.

JOSEPH W. WESTBROOK, Sr.

REFERENCES CITED

The following references are of record in the file of this patent:

UNITED STATES PATENTS

| Number | Name | Date |
| --- | --- | --- |
| 1,582,636 | Clarke | Apr. 27, 1926 |
| 1,670,693 | Sidwell | May 22, 1928 |
| 2,078,368 | Brannock | Apr. 27, 1937 |
| 2,175,116 | Hack et al. | Oct. 3, 1939 |
| 2,181,930 | Wheeler | Dec. 5, 1939 |

FOREIGN PATENTS

| Number | Country | Date |
| --- | --- | --- |
| 317,888 | Great Britain | Mar. 25, 1929 |
| 458,313 | Great Britain | June 25, 1936 |
| 606,281 | Germany | May 7, 1934 |